United States Patent Office 3,808,267
Patented Apr. 30, 1974

3,808,267
MEMBRANE PROCESS FOR RECOVERY OF CARBOXYLIC ACIDS FROM DILUTE AQUEOUS SOLUTIONS
James C. Davis, Benicia, and Robert R. Grinstead, Walnut Creek, Calif., assignors to The Dow Chemical Company, Midland, Mich.
No Drawing. Filed Aug. 31, 1972, Ser. No. 285,545
Int. Cl. C01c 51/48
U.S. Cl. 260—527 R
4 Claims

ABSTRACT OF THE DISCLOSURE

A $C_2$ to $C_4$ mono- or dicarboxylic acid is transferred from a dilute aqueous solution to an organic liquid through an intervening microporous membrane. The organic liquid comprises at least one polar organic compound selected from the group consisting of trialkyl phosphates, dialkyl alkyl phosphonates, alkyl dialkyl phosphinates, trialkyl phosphine oxides, dialkyl alicyclic amidophosphates, dialkyl sulfoxides and tetralkyl ureas. An improved method for the removal of carboxylic acid contaminants from aqueous effluents or recycle streams is provided.

BACKGROUND OF THE INVENTION

It has been proposed to recover various carboxylic acids from aqueous solutions by direct contact with several different types of polar organic extractants. For example, see the following patents:

| Patent | Acid recovered | Extractant |
|---|---|---|
| U.S. 2,275,862 | Acetic | $C_6$–$C_{10}$ dialkyl ketones. |
| U.S. 2,395,010 | do | Amyl acetate or methyl amyl ketone. |
| U.S. 2,446,231 | do | Ethyl disulfide. |
| U.S. 2,480,380 | Cyanoacetic | Methyl isobutyl ketone. |
| Czech. 137,177 (C.A. 75: 63155y). | Formic, acetic or propionic. | Cyclohexanone. |

It has also been proposed to recover carboxylic acids from aqueous solutions by several membrane processes. For example, U.S. Pat. 2,411,239 suggests the use of tubular shaped semi-permeable, hydrophilic membranes for the separation of citric acid from aqueous solutions by dialysis. In a paper published in 1963 (Ind. Eng. Chem. Fundamentals, 2, pp. 53, 54) data is given for an experiment on reverse osmotic separation of acetic acid from a 0.25 molal solution in water, using a cellulose acetate membrane. At a transmembrane pressure differential of 750 p.s.i.s., a 20.5% recovery of acetic acid was attained.

As a general proposition, the use of permeable membranes simply as artificial phase boundaries in extractive equilibration of liquid phases of differing composition is known. For example, see Kirk-Othmer, Encyclopedia of Chemical Technology, 2nd Edition, vol. 7, p. 1. See also Chemical Abstracts, 74: 7106a.

The organic extractants which have been proposed for recovery of carboxylic acids from aqueous solutions are not efficient enough for the processing of highly dilute solutions. In general, such solutions can be recycled or, if they do not also contain more toxic and/or persistent materials, can be discarded without constituting a serious source of pollution. However, this is not always the case. For example, the well known process for making phenol from chlorobenzene produces a waste brine stream containing about 18-20 wt. percent of sodium chloride, about 0.2% sodium acetate and trace amounts of phenol, benzene and acetone. Such streams cannot be disposed of in surface waters and have too high a content of organics to be suitable as a feed to electrolytic chlor/alkali cells. It has now been found that such solutions can be made suitable as cell feeds at a minimal cost. The sodium acetate content of the brine stream is converted to sodium chloride and acetic acid by addition of an equivalent amount of hydrochloric acid. The acetic acid is then removed by the practice of the instant invention.

In some cases, an otherwise suitable extraction process is impracticable due to phase separation difficulties and/or losses of the extractant to the raffinate phase. These problems are avoided by use of an appropriate membrane.

SUMMARY OF THE INVENTION

Lower carboxylic acids are recovered from dilute aqueous solution by contacting the solution with one side of a microporous membrane while contacting the other side of the membrane with a liquid organic solvent for the acid or acids. The membrane has an average effective pore diameter of from 10 to 200 A. and is composed of a material which is not detrimentally effected by either the aqueous or organic phases it is contacted with. The aqueous solution comprises a total of 2 weight percent or less of one or more two to four carbon, mono- or dicarboxylic acids optionally substituted with from one to three chlorines or fluorines, or with one hydroxyl, oxo, cyano, methoxyl or ethoxyl group. The carbon to oxygen atomic ratio in each of said acids is not less than 1.0 nor greater than 2.0. The organic solvent comprises at least 1 weight percent of a polar extractant selected from the group consisting of (a) trialkyl phosphates

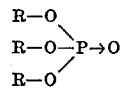

wherein each R is a $C_2$ to $C_{12}$ alkyl group and the total number of carbons in the molecule is from 12 to 36,
(b) dialkyl alkyl phosphonates

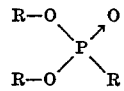

wherein each R is a $C_2$ to $C_{12}$ alkyl group and the total number of carbons in the molecule is from 10 to 36,
(c) alkyl dialkyl phosphinates

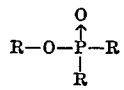

wherein each R is a $C_2$ to $C_{12}$ alkyl group and the total number of carbons in the molecule is from 10 to 36,
(d) trialkyl phosphine oxides

wherein each R is a $C_2$ to $C_{12}$ alkyl and the total number of carbons in the molecule is from 10 to 36,
(e) dialkyl alicyclic amidophosphates

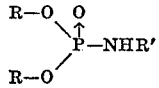

wherein each R is a $C_2$ to $C_{12}$ alkyl and R' is a $C_5$ to $C_7$ alicyclic radical,
(f) dialkyl sulfoxides

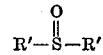

wherein each R' is a $C_3$ to $C_{12}$ alkyl group and the total number of carbons in the molecule is at least 8, (g) tetraalkyl ureas

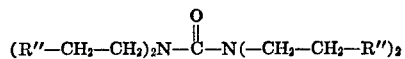

wherein each R'' is a $C_1$ to $C_7$ alkyl group and the total number of carbons in the molecule is from 12 to 36.

DETAILED DESCRIPTION OF THE INVENTION

Representative lower carboxylic acids which may be recovered from aqueous solutions by the instant method are as follows:

| Acid | Formula | Atomic ratio of carbon to oxygen |
|---|---|---|
| Acetic | $CH_3COOH$ | 1.0 |
| Propanoic | $C_2H_5COOH$ | 1.5 |
| Butyric | $C_3H_7COOH$ | 2.0 |
| Crotonic | $CH_3-CH=CH-COOH$ | 2.0 |
| Propiolic | $CH\equiv C-COOH$ | 1.5 |
| Cyanoacetic | $NC-CH_2-COOH$ | 1.5 |
| Lactic | $CH_3-CH(OH)COOH$ | 1.0 |
| Glycolic; ethyl ether | $CH_3-O-CH_2-COOH$ | 1.33 |
| Trifluoroacetic | $CF_3COOH$ | 1.0 |
| Pyruvic | $CH_3-CO-COOH$ | 1.0 |
| Lactic; methyl ether | $CH_3-CH(OCH_3)COOH$ | 1.33 |
| Malonic; mono methyl ester | $CH_3-O-\overset{\overset{O}{\|}}{C}-CH_2COOH$ | 1.0 |
| Ethane-1,1-dicarboxylic | $HOOC-CH(CH_3)COOH$ | 1.0 |
| Maleic or fumaric | $HOOC-CH=CH-COOH$ | 1.0 |
| 2,3-dichloroacrylic | $Cl-CH=\underset{\underset{Cl}{\|}}{C}-COOH$ | 1.5 |
| Acetylene dicarboxylic acid | $HOOC-C\equiv C-COOH$ | 1.0 |
| Methacrylic | $CH_2=C(CH_3)-COOH$ | 2.0 |

The aqueous solution of the acid or acids to be recovered may additionally comprise any other dissolved or suspended substances which do not prevent the requisite permeation through the membrane or otherwise interfere with the process. For example, other organic solutes, salts, suspended particles of carbon, ion-exchange resins or cellulosic fibers may be present. Whether or not other organics co-extract with the acid is immaterial to the instant invention. If co-extraction does occur and it is desired to separate the recovered acid, this can be done in a number of ways apparent to those skilled in the art. Since the primary utility of the present process is as a late stage clean-up step before disposal or recycle of an effluent, co-extraction of any other organics will generally be advantageous.

A wide variety of membranes can be employed. The membrane structure may be isotropic or anisotropic and can be composed of any inorganic or organic substance which will not be detrimentally affected by the liquids to be contacted and which can be formed into the requisite "microporous" structure. The latter term is not to be construed as limiting in terms of details of membrane structure and the term "effective pore diameter" as used herein does not restrict the process to the use of membranes pierced by discrete cylindrical capillaries. It is to be regarded, rather, as characterizing the requisite spacing between membrane molecules. At effective pore diameters in excess of about 200 A., simple aggregated or convective flow of the aqueous solution in channels through the membrane tends to occur. At diameters of less than 10 A., interaction between membrane molecules and the aqueous solution component molecules become large in comparison to interactions between solution molecules and transport will generally be unnecessarily restricted. Rejection of other solutes, such as salts, is due to insolubility in the organic phase, rather than by selective retardation within the membrane. The "average effective pore diameter" of this ("molecular sieve") type of membrane can be determined by electron microscopy or from the molecular dimensions of solute species which will and will not pass through the membrane. Since transport through such membranes is not diffusion limited, the membrane thickness is not a critical factor in the practice of the present process. The hydraulic resistance to flow will be proportional to the membrane thickness, but will generally be quite low in comparison to the diffusional resistance at the interface between the two liquid phases.

Membranes fabricated as bundles of elongated capillaries, i.e., as "hollow fibers," afford maximal membrane areas and minimal membrane thicknesses, yet derive sufficient strength from their cross-sectional shape as to be self-supporting even under relatively high transmembrane pressure differentials. These advantages accrue to the practice of the present process when the membrane employed is formed as hollow fibers. Separatory devices employing hollow fibers and methods of making such fibers are now well known. See, for example, U.S. Pats. 3,228,876 (Mahon); 3,423,491 (McLain et al.); 3,536,611 (Filippi et al.); 3,503,515 (Tomsic) and 3,645,890 (Lukach et al.). See also U.S. Pats. 3,494,780 and 3,532,527 (Skiens), which teach methods of making hollow fibers of enhanced permeability. Typical dimensions of hollow fibers made by the methods of the preceding patents are from 50 to 300 microns I.D. with wall thicknesses of from 5 to 50 microns.

In the practice of the present invention, negligible transmembrane pressure differentials will exist and accordingly, wall thicknesses as low as 5 microns are operable.

When the membrane is in the form of hollow fibers, the effect of extractant solution viscosity becomes particularly important. The proportion and type of diluent in this case should be such that the viscosity of the extractant solution is not in excess of 100 cps. Also, processing of effluents containing suspended matter will generally not be practicable.

Suitable organic liquids for the practice of the present invention do not detrimentally affect the membrane used and comprise at least 1 weight percent of one or more polar extractants selected from groups (a) through (g) in the preceding list. These extractants have been found satisfactory for the recovery of lower carboxylic acids from quite dilute aqueous solutions. Those extractants which are liquids at the contemplated temperature of operation can be employed neat or diluted with an organic solvent which has little or no solubility in the aqueous acid solution to be processed. Those extractants which are solids—such as trioctyl phosphine oxide—will necessarily be dissolved in such a solvent.

The concentration of the extractant in the organic phase is primarily viscosity limited but may be as high as 100 percent.

Examples of suitable organic diluents are kerosene, carbon tetrachloride, amyl acetate, toluene, ethyl benzyl ketone, dibutyl ether, benzonitrile, 2,2-dichloro propane, heptane, 1-nitrobutane, triethyl phosphite, 1-pentanol, ethoxy (triethyl) silane and 1-fluoropentane.

The choice of a diluent will depend on several factors generally apparent to those skilled in the art. For example, the diluent must be a good enough solvent for the polar extractant or extractants to provide a total concentration of at least 1 weight percent. It must not dissolve the membrane or alter the membrane structure to such an extent that the effective pore diameter is put outside of the requisite 10 to 200 A. range. The diluent should not be significantly degraded by whatever physical or chemical treatment is used to strip the extracted acid from the loaded extractant solution. If stripping is done by contacting with an aqueous base, for example, the stripped extractant phase should be immiscible with and readily disengaged from the aqueous phase.

Any appropriate method may be used to remove the carboxylic acid from the loaded extractant or extractant solution. For example, the acid can be distilled off as an azeotrope with a portion of the diluent and then frozen out, base precipitated as a salt or selectively adsorbed. Alternatively, the loaded extractant phase may be directly contacted with gaseous ammonia and the resulting ammonium carboxylate removed by water washing or filtration. Stripping may also be accomplished by counter-current contacting with a member of volumes of water.

The transfer of acid from the aqueous feed to the extractant phase through the membrane can be carried out with either co-current or counter-current flow of the two phases. The latter mode is more efficient and will generally be preferred.

SPECIFIC EMBODIMENTS

Dialysis studies with simulated phenol plant effluent brine were conducted with the Dow hollow fiber "kidney," and the National Bureau of Standards (NBS) dialysis test cell.

Hollow fiber kidney

Several experiments were performed with "kidney" units to determine non-aqueous single pass, counter-current mass transfer coefficients. The Dow kidney contains about one square meter of surface area of regenerated cellulose fibers which are 210μ. I.D. x 260μ O.D. and resembles a miniature shell and tube heat exchanger. About 10,000 hollow fibers are closely spaced in parallel as a bundle about 1½ inches in diameter and 6 inches long. The fiber ends pass in sealing arrangement through silicone rubber "tube sheets" and communicate with inlet and outlet "headers." The fiber/tube sheet assembly is mounted in a shell having inlet and outlet connections. Generally, the metered organic stream was pumped through the inside of the fibers while the metered aqueous "waste stream" was pumped through the shell around the outside of the fibers. Aqueous streams were substituted for the organic to study the contribution of the organic phase to the overall mass transfer resistance. In all cases, the feed and effluent waste brine streams were assayed for acetic acid content. Several samples were taken during each run to assure a steady state situation in the contractor. The overall mass transfer coefficient was calculated using a ln mean concentration driving force.

Chemical analyses

Chloride ion.—Chloride was determined in aqueous media by coulombmetric titration using an Aminco-Cotlove instrument built by the American Instrument company.

Acetic acid.—Both organic and aqueous streams were analyzed for acetic acid. Aqueous concentrations were determined with a potentiometric titrator; no further sample preparation was necessary. Organic acetic acid concentrations were also determined with a potentiometric titrator with initially one part tributyl phosphate, three parts acetone and one part water. The resulting two-phase system was titrated at no greater rate than 2.0 cc. per minute of 0. 10 N KOH with vigorous stirring.

Tributyl phosphate.—TBP was obtained from the Organic Chemicals Division, FMC Corporation and was used as received. Trace TBP in the brine phase was determined by back extraction into $CS_2$ and gas chromatographic analysis of the organic $CS_2$ solution.

Phenol.—Phenol concentrations were determined by ultraviolet absorption at 278 mμ. Tests of tributyl phosphate saturated brine indicated no interference by the brine, TBP or acetate.

EXAMPLE 1

Distribution of acetic acid between brine and tributyl phosphate

The solubility of TBP was determined to be 50 p.p.m. in equilibrium with "waste brine." With trioctylphosphine oxide, the equilibrium solubility is about 1 p.p.m. in the "waste brine."

To evaluate the maximum possible extraction of acetic acid into TBP, the distribution ratio was determined at acid concentrations of 1500, 5000 and 10,000 p.p.m. The synthetic brine contained 20% sodium chloride and pH adjustments to 3.0 were made with hydrochloric acid. A distribution ratio of 5 in favor of the organic phase was found at each concentration.

Hollow fiber kidney—overall mass transfer coefficients

The mass transfer data obtained with the hollow fiber kidney is summarized in Table I.

TABLE I.—MASS TRANSFER COEFFICIENTS—HOLLOW FIBER KIDNEY [a]

| Temp., °C. | Brine feed Composition | Flow rate, cc./min. | Dialysate Composition | Flow rate, cc./min. | Mass transferred, grams per m.²/minute | Transfer coefficient cm./min. |
|---|---|---|---|---|---|---|
| 25 | 0.9% NaCl [b] | 200 | $H_2O$ | 500 | 1.35 | [c] 0.023 |
| 65 | 0.9% NaCl [b] | 200 | $H_2O$ | 500 | 1.45 | [c] 0.025 |
| 25 | 20% NaCl,[b] 0.2% acetic acid | 200 | 20% NaCl | 500 | 0.28 | [d] 0.021 |
| 25 | do | 500 | TBP [b] | 250 | 0.19 | [d] 0.016 |

[a] All measurements on same kidney.
[b] Through inside of fibers.
[c] NaCl.
[d] Acetic acid.

NBS dialysis test cell

Laug and Stokesberry of the National Bureau of Standards have developed a test cell to measure the diffusive transport across a semipermeable membrane. A membrane area of 51 cm.² is used with this dialyzer. The liquid phase transport resistances are minimized through the inclusion of turbulence promoting screens and narrow flow channels on each side of the membrane. Aqueous/non-aqueous dialysis studies with this type cell were performed to estimate the transport potential if only the membrane or fibers impeded dialysis of acetic acid from the aqueous to the organic. In the NBS test cell the two streams were circulated from closed systems at high velocity through the test cell on each side of the membrane. The changes in reservoir concentrations were followed with time. All flat membranes used with this cell were 1.0 mil thick Bemberg type cellophane or cuprophane.

Substitution of TBP for the 20% NaCl dialysate resulted in a 24% decrease in the measured mass transport coefficient which probably results from the increased viscosity of the TBP, significantly affecting the solute diffusion rate.

NBS test cell—overall mass transfer coefficients

The transfer coefficients obtained with the NBS cell at 25° C. are summarized in Table II.

TABLE II.—MASS TRANSFER COEFFICIENTS—NBS TEST CELL

| Brine | Dialysate | Transfer coefficient cm./min |
|---|---|---|
| 0.9% NaCl | $H_2O$ | [1] 0.06 |
| 0.9% NaCl | $H_2O$ | [1] 0.05 |
| 20% NaCl, 0.2% acetic acid | 20% NaCl | [2] 0.04 |
| Do | TBP | [2] 0.02 |

[1] NaCl.
[2] Acetic acid.

With the NBS dialyzer a 30% reduction in mass transfer coefficient accompanied the substitution of the TBP for the 20% NaCl dialysate. The measured transfer coefficient of 0.027 cm./min. for the TBP system more fully reflects the permeability achievable in an industrial dialyzer. Here clinical constraints need not be imposed on the design as in the case of an artificial kidney.

EXAMPLE 2

Removal of monochloroacetic acid from 2% solution in water, using a hollow fiber beaker dialyzer The dialyzer used was of a type commercially available from The Dow Chemical Company. A tow of one thousand fibers, about 7" long, hangs as a U-shaped loop having its terminal portions potted in inlet and outlet coupling members integrally formed with the closed end of an inverted plastic beaker about 2" in diameter and 3" high. Inlet and outlet connections are joined to the coupling members to provide for passage of the solution being treated through the fiber lumen. Dialysate inlet and outlet connections are also formed integrally with the closed end of the beaker. The open (lower) end of the beaker is provided with a recessed flange, which retains a plastic screen disk, and is joined in a fluid tight seal to a shallow plastic cup in which a mangetic stirrer bar is placed. The fibers are of cellulose and have inner diameters of 200 microns, outer diameters of 250 microns and a total effective membrane area of 1000 cm.$^2$.

(A) 75 ml. of a 10 wt. percent solution of trioctyl phosphine oxide in kerosene was placed in the beaker and 100 ml. of the 2% (21.2 g./l.) chloroacetic acid solution was circulated through the fiber interiors at a rate of about 100 ml. a minute. A magnetic stirrer was employed to agitate the organic phase. After 20 minutes the concentrations of the acid in the organic and aqueous phases were respectively 17.9 and 7.9 grams/liter. After four hours equilibrium had been attained and the organic and aqueous concentrations were 23.0 and 4.0 grams/liter, respectively. The distribution coefficient (D) was then 5.75 and the mass transfer coefficient was calculated as:

$$K = \frac{V_O V_A}{V_O + V_A} \cdot \frac{1}{A \cdot t} \cdot \ln\left(\frac{C_{aq} - C_{org}}{C_{aq_t} - \frac{1}{D} C_{org_t}}\right) = 0.007 \text{ cm./min.}$$

where A is the effective membrane area, $t$ is the elapsed dialysis time and C is chloroacetic acid concentration in the phase and at the time indicated.

The temperature during the test was 25° C.

(B) The dialysis of preceding test A was repeated, but the organic phase consisted 100% of tetra-n-butyl urea.

| Dialysis time | Chloroacetic acid concentration, g./l. | |
|---|---|---|
| | Organic phase | Aqueous phase |
| 70 min | 17.0 | 8.45 |
| 4 hrs. (equilibrium) | 22.0 | 4.9 |

The distribution coefficient was 4.5 and the mass transfer coefficient, calculated as above, was 0.002 cm./min.

Note: The viscosity of undiluted tributyl urea is about 100 cps. and this presumably accounted for the relatively low transfer coefficient.

Electron microscope examination shows that in each of the membranes employed in the preceding example, the average effective pore diameters are within the range of 10 to 200 A.

We claim:

1. A process for the recovery of lower carboxylic acids from dilute aqueous solution, comprising:

contacting one side of a microporous membrane with said aqueous solution while contacting the other side of the membrane with a water immiscible, liquid organic solvent for said acid, said membrane having an average effective pore diameter of from 10 to 200 A and being not detrimentally affected by said aqueous solution or said organic solvent, said aqueous solution having a lower carboxylic acid content of two percent or less by weight, said content consisting of one or more two to four carbon, mono- or dicarboxylic acids substituted with from zero to three chlorines or fluorines, or with zero or one hydroxyl, oxo, cyano, methoxyl or ethoxyl group, the carbon to oxygen atomic ratio in each of said acids being not less than 1.0 nor greater than 2.0, said organic solvent comprising a total of at least one weight percent of one or more, and separating the resultant loaded extractant and raffinate solutions.

2. The process of claim 1 in which said membrane is in the form of hollow fibers.

3. The process of claim 1 in which said extractant is trioctyl phosphine oxide.

4. The process of claim 1 in which said aqueous solution is a brine containing about 18–20 wt. percent sodium chloride and about .2 wt. percent sodium acetate which has been treated with an amount of hydrochloric acid equivalent to the amount of sodium acetate present.

References Cited

UNITED STATES PATENTS 3,470,238   9/1969   Asano et al. _____ 260—526 N

OTHER REFERENCES

Kirk-Othmer, Encyclopedia of Chem. Techn., vol. 7, p. 1.

VIVIAN GARNER, Primary Examiner

U.S. Cl. X.R.

260—465.4, 485 S, 526 N, 526 R, 535 R, 539 A, 539 R, 540, 541

PO-1050
(5/69)

UNITED STATES PATENT OFFICE
CERTIFICATE OF CORRECTION

Patent No. 3,808,267                    Dated   April 30, 1974

Inventor(s)    J. C. Davis and R. R. Grinstead

It is certified that error appears in the above-identified patent and that said Letters Patent are hereby corrected as shown below:

Column 5, line 41 "contractor" should be -- contactor -- ;

Column 8, line 31 should read -- weight percent of one or more trialkyl phosphine oxides

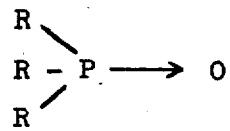

wherein each R is a $C_2$ to $C_{12}$ alkyl and the total number of carbons in the molecule is from 10 to 36 -- .

Signed and sealed this 26th day of November 1974.

(SEAL)
Attest:

McCOY M. GIBSON JR.                C. MARSHALL DANN
Attesting Officer                  Commissioner of Patents